Patented Jan. 2, 1951

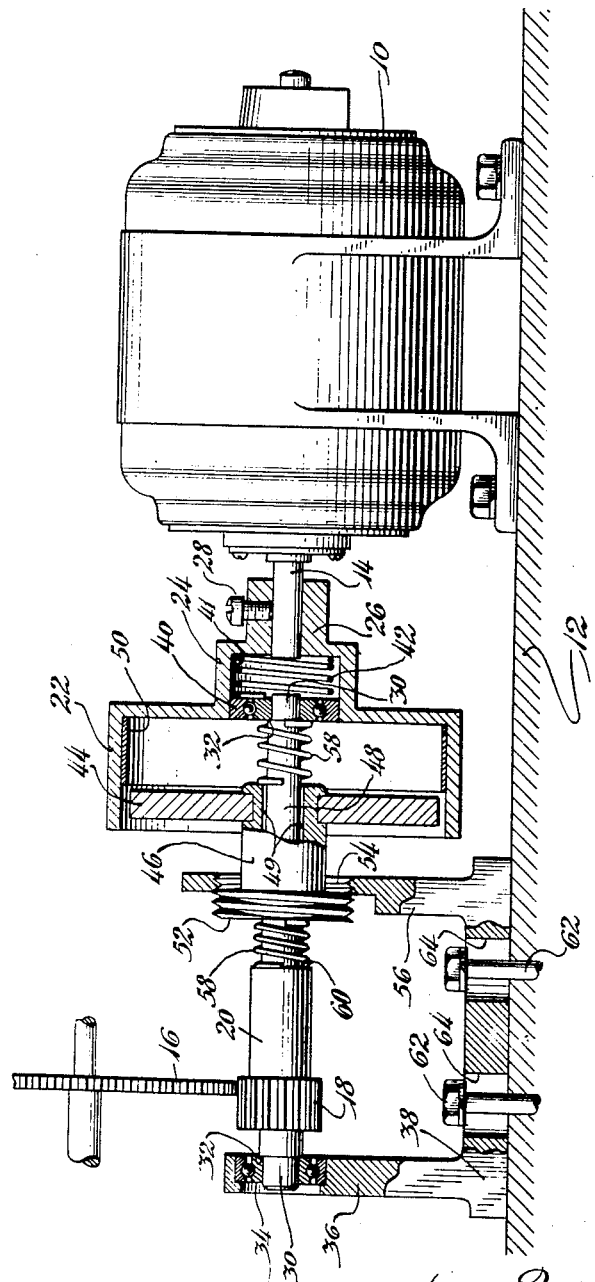

2,536,207

UNITED STATES PATENT OFFICE 2,536,207

MAGNETIC CLUTCH

Horace M. Norman, Skokie, Ill., assignor to Stewart-Warner Corporation, Chicago, Ill., a corporation of Virginia Application October 2, 1948, Serial No. 52,562

13 Claims. (Cl. 172—284)

The present invention relates to torque transmitting devices and more particularly to a magnetic clutch automatically operable to vary the torque transmitting capacity thereof and manually adjustable for the purpose of setting the limits between which it is automatically adjustable.

In certain instances it is desirable to have a clutch between a driving means and a driven means which is capable of having its torque transmitting capacity varied automatically. This may be desirable, for example, in hose reels used in automotive service stations for storing the hose in which air, water, lubricant, etc., are dispensed. When hose is being unreeled it is preferable that at least a slight torque be applied to the reel shaft to maintain a slight tension on the hose but it is not necessary or desirable to apply the full torque which is required to rewind the hose. However, in the conventional power operated hose reels this has usually been the case. For example, in one type of power operated reel a spring motor is provided for rewinding the hose. This spring motor is automatically rewound by the act of unreeling the hose so that unreeling is opposed by the full force of the spring which is more than is required to maintain the desired tension on the hose. Other hose reels have a fluid pressure motor for rewinding the hose and the hose is unreeled against the pressure exerted by the motivating fluid. In either case, unreeling of hose is opposed by the full rewinding torque which ordinarily will be more than is necessary to maintain the proper tension on the hose.

The present invention is concerned with a clutch which, under the above circumstances, is capable of applying maximum torque when it is desired to rewind hose and a lesser torque when hose is being unreeled, and which functions automatically to change the amount of torque applied to the reel. Furthermore, the clutch is capable of being adjusted to increase or decrease the maximum amount of torque transmitted.

Accordingly an object of the invention is the provision of a new and improved torque transmitting device capable of changing its torque transmitting capacity automatically between definite limits and in which those limits may be varied by manual adjustment.

Another object of the invention is to provide a device as above set forth in which the torque transmitting capacity may be changed between definite limits automatically by an operator at a point remote from the device.

A further object of the invention is the provision of a new and improved magnetic clutch for establishing a nonpositive driving connecting between a driving means and a driven means in which the torque of the driving means is transmitted without requiring direct contacting engagement between parts of the clutch so that the clutch is not subject to wear.

A still further object of the invention is the provision of a new and improved magnetic clutch of exceedingly simple and inexpensive construction which is easy to adjust and which has few parts so that it may be used for long periods of time without malfunctioning or without requiring repair.

These and other objects, advantages and capabilities of the invention will become apparent from the following specification in which reference is had to the accompanying drawing wherein the single figure is an axial section through the clutch mechanism with the driving motor shown in elevation and the driven means shown fragmentarily and more or less diagrammatically.

In this figure a driving means consisting of an electric motor is shown at 10 secured to a fixed base 12. This motor has a shaft 14 to which one element of the improved clutch is directly connected. For the purpose of illustrating the operation of the clutch it will be assumed that it is being used to drive the reel shaft of a hose reel apparatus of the type used to store lubricant hose in an automotive service station, but it is to be understood that its use is not limited to such applications. The reel shaft is driven through a train of gears which may include a large gear 16 driven by a pinion 18 on a gear shaft 20 which forms part of the clutch mechanism.

The clutch includes a generally cup-shaped driving member 22 of iron or other ferromagnetic material which has an axial extension 24 of reduced diameter that terminates in a hub 26. When the driving member is to be secured directly to the motor shaft the hub 26 may be fixed thereon by a set screw 28 or other suitable means so that the cup-shaped member rotates with the motor shaft.

In addition to its functions as the driving member of the clutch the cup-shaped member 22 also supports one end of the gear shaft 20. This shaft is reduced adjacent its opposite ends to provide trunnions 30, upon which the shaft rotates, and shoulders 32 for preventing axial movement of the shaft when the clutch is in operation. The shaft is supported coaxially with respect to the cup-shaped member. Its left trunnion 30, as seen in the drawing, is secured in a combined thrust and journal antifriction bearing 34 carried in an upright arm 36 on a bearing bracket 38 secured to the fixed base structure 12. The right-hand end of the shaft is supported in a second combined thrust and journal antifriction bearing 40. This latter bearing is slidable in a bore 41 in the reduced extension 24 on the cup-shaped member 22. It is urged outwardly of this extension by a coil spring 42 reacting between the bearing and the outer end of the extension so that the spring in effect cushions the shaft 20 against axial movement.

The driven element of the clutch is mounted upon the gear shaft 20 and comprises a generally disc-shaped permanent magnet 44 of somewhat smaller diameter than the internal diameter of the cup-shaped member 22 so that it may be received therein. The magnet 44 is preferably of the type known commercially as Alnico, and preferably has a plurality of poles concentrated at its periphery. It is secured to a hub 46 which is longitudinally slidable upon an intermediate portion 48 of the shaft 20 and is splined thereto by feather keys 49. By reason of this mounting of the magnet 44 the relative position of the magnet endwise or axially of the cup-shaped member 22 may be changed for a purpose which will be explained hereinafter. However, it is not desirable to have the magnet move completely out of the cup for reasons which will appear hereinafter.

One of the features of the invention is the means which I have devised for utilizing the effect of eddy currents to vary the torque which the clutch is capable of transmitting. As indicated in the drawing, the cup-shaped member 22 has a sleeve or shell 50 suitably fixed therein adjacent one of its ends. This shell is made from a material, such as aluminum, which is conductive but not magnetic and, therefore, is susceptible to having eddy currents induced therein when it is placed in a moving magnetic field or when it is moved relative to a stationary magnetic field.

It will be understood that upon relative rotation of the magnet 44 and cup-shaped member 22 and the consequent movement of the latter and the shell 50 through the field of the magnet eddy currents will be induced in the shell. These induced eddy currents result in a drag being exerted between the relatively rotating parts, the effect of which is to cause a torque to be exerted upon the driven element, i. e., the magnet, tending to rotate the magnet in the same direction as the cup-shaped driving member.

The magnitude of the eddy currents induced in the shell will of course depend upon the relative axial position of the magnet and cup-shaped driving member because this will determine the portion of the flux of the magnet which threads the shell relative to the portion which threads the cup only. The flux threading the cup does produce a drag between the relatively rotating parts due to hysteresis in the cup, but the torque resulting from this effect is small compared to that resulting from eddy currents induced in the shell.

In the position in which the magnet 44 is shown in the drawing, most of its flux threads the cup-shaped member 22 and, therefore, the torque transmitting capacity of the clutch will be small. However, when the magnet 50 is moved axially to the right, as seen in the drawing, more of its flux threads the shell so that the eddy current drag between the parts is increased and as a result the torque transmitting capacity of the clutch is increased. Thus it will be seen that the torque transmitting capacity of the clutch may readily be varied by moving the magnet axially relative to the cup-shaped member and shell. The capacity of the clutch can also be varied by increasing the speed of rotation of the driving member particularly when the clutch is in high torque transmitting position, because the torque transmitted tends to increase as the relative speed increases. This is not entirely true when the parts are in the low torque transmitting position because there is a definite upper limit to the torque which results from hysteresis.

When the clutch is to be used for driving a hose reel or similar apparatus in which the driven or gear shaft 20 is rotated in one direction during unwinding and in the opposite direction during rewinding of the hose, the novel structure shown in the drawing may be used to impart axial movement to the hub 46 and magnet 44 for changing the torque transmitting capacity of the clutch. As indicated in the drawing, the hub is provided with an externally threaded collar or enlarged part 52 on its end opposite that on which the magnet is secured. The threads on this enlarged part are adapted to be engaged with the threads in an aperture 54 formed in an upright arm 56 on the bearing bracket 38 and these parts cooperate to move the hub and magnet axially on the gear shaft 20 a distance equal to the thickness of the bracket arm 56 plus the thickness of the threaded collar 52.

For example, if the hub and magnet, when in the position shown in the drawing, are rotated in the proper direction to engage the threads on the enlarged part 52 with the threads in the aperture 54, the hub and magnet will move to the right until the enlarged part has been threaded completely through the aperture and is on the opposite or right side of the arm 56. They will remain there during continued rotation of the hub and magnet in the same direction but will be shifted back to the left side of the arm automatically if the direction of rotation of the parts is reversed.

Axial adjustment or movement of the hub 46 is resisted by duplicate compression springs 58 on the gear shaft 20 engaging opposite ends of the hub. The left spring reacts between the left end of the hub and an intermediate shoulder 60 on the gear shaft which may be integral with the shaft or may be one end of a sleeve upon the shaft abutting at its other end against the right end of the pinion 18. This spring holds the right end of the enlarged part against the left side of the arm 56 when the hub and magnet are in the position shown in the drawing. The right spring reacts between the right end of the hub and the right thrust bearing 40, and holds the left end of the enlarged part 52 against the right side of the bracket arm when the enlarged part is on the right side of the arm. As a result, the hub is always conditioned for movement axially upon change in its direction of rotation.

Since the compression of these springs is exerted against the end of the gear shaft 20, the reason for using the combined thrust and journal antifriction bearings 34 and 40 to support the shaft will be apparent. It should also be noted that the cushioning spring 42 previously mentioned should be of greater strength than the compression springs 58 to maintain the right-hand bearing 40 in position in the outer end of the reduced extension 24 on the field member.

The bearing bracket is secured to the fixed base structure 12 by means of bolts or cap screws 62 passing through apertures 64 in the base of the bearing bracket and into the base structure. These apertures are elongated as indicated to allow the bearing bracket to be adjusted toward and away from the cup 22. In this way the relative axial position of the magnet 44 with respect to the cup 22 may be varied so that more or less of the flux of the magnet threads the shell 50 when the clutch is in its high torque position. It has previously been explained that this is one way of varying the torque transmitting capacity of the clutch and thus making the clutch adaptable for use, for example, on reels for heavy hose which require a relatively large torque to rewind and on reels for lighter hose requiring less torque to rewind.

A further feature of the invention is to be found in the shape of the cup-shaped member 22. This member completely surrounds the magnet 44 when the latter is at either of its positions of adjustment so that there is no change in the flux of the magnet when it is shifted axially between its two positions of adjustment, the only change being in the amount of flux which threads the shell 50. As a result, there is no appreciable axial force on the magnet when it is being shifted.

Operation of the clutch when it is used, for example, for driving a hose reel, should be apparent and will not be described in detail. In the drawing the magnet is shown at the low torque position it will assume automatically when hose is being unreeled, thus making unreeling of the hose easy, but maintaining some tension on the hose. Furthermore, since the magnet during unreeling rotates in a direction opposite to that in which the motor drives the cup member 22, and the motor runs constantly, the drag on the motor is low due to the low torque transmitting capacity of the clutch. When the hose is released after being unreeled, the torque between the magnet and the rotating cup-shaped member will be sufficient to cause the magnet and gear shaft to start rotating in the same direction as the cup-shaped member. As the magnet starts rotating in this latter direction the hub and magnet will shift to the right to the high torque position and rewinding of the hose will then proceed with maximum torque applied to the reel shaft.

While I have shown and described a preferred embodiment of my invention, it will be apparent that numerous variations and modifications thereof may be made wthout departing from the underlying principles of the invention. I, therefore, desire, by the following claims, to include within the scope of the invention all such variations and modifications by which essentially the results of my invention may be obtained through the use of substantially the same or equivalent means.

I claim:

1. In a device for transmitting torque from a rotary driving member to a rotary driven member, flux-producing means connected to one of said members, means connected to the other member and adapted to be influenced by said flux-producing means to produce a drag between said two means upon relative rotation of the same including means susceptible to having eddy currents induced therein upon relative rotation of the two means, means supporting said flux-producing means and the means influenced thereby for relative movement axially to vary the amount of flux threading the eddy current susceptible means and thereby vary the torque exerted on said driven member when said driving member is rotated, and means for moving one of said rotating parts axially relative to the other including cooperating cam means on the rotatable part and a fixed part of said device effective to move said rotatable part axially in response to changes in the direction of rotation thereof.

2. In a device for transmitting torque from a rotary driving member to a rotary driven member, flux-producing means connected to one of said members, means connected to the other member and adapted to be influenced by said flux-producing means to produce a drag between said two means upon relative rotation of the same including means susceptible to having eddy currents induced therein upon relative rotation of the two means, means supporting said flux-producing means and the means influenced thereby for relative movement axially to vary the amount of flux threading the eddy current susceptible means and thereby vary the torque exerted on said driven member when said driving member is rotated including a shaft and a hub slidable longitudinally thereon for supporting one of said rotatable means, and cooperating cam means on said hub and a fixed part of said device adapted to move the part supported by said hub axially in response to changes in the direction of rotation of the hub.

3. A device for effecting a nonpositive driving connection between a driving means and a driven means comprising a generally cup-shaped member of magnetic material operatively connected to one of said means, a generally disc-shaped permanent magnet axially disposed with respect to said cup-shaped member and connected to the other means, a shell of nonmagnetic conductive material in said cup-shaped member adapted to be influenced by magnetic flux to produce a drag between said magnet and cup-shaped member upon relative rotation of these two parts, and means for relatively moving said cup-shaped member and magnet in an axial direction between predetermined positions automatically in response to changes in the direction of relative rotation of said two rotatable elements for varying the amount of flux threading said shell and thereby varying the torque applied to said driven means upon rotation of said driving means.

4. A device for effecting a nonpositive driving connection between a driving means and a driven means comprising a generally cup-shaped member of magnetic material operatively connected to one of said means, a generally disc-shaped permanent magnet axially disposed with respect to said cup-shaped member and connected to the other means, a shell of nonmagnetic conductive material in said cup-shaped member adapted to be influenced by magnetic flux to produce a drag between said magnet and cup-shaped member upon relative rotation of these two parts, and means supporting said magnet and cup-shaped member for rotation and for axial movement between predetermined limits to increase or decrease the flux threading said shell and thereby increase or decrease the torque transmitting capacity of the device, including members movable relatively to vary the axial position of said magnet relative to said cup-shaped member and thereby vary the location of the predetermined limits to which said two elements are relatively movable axially for increasing or decreasing the proportion of the flux threading the cup-shaped member and shell when the cup-shaped member and magnet are at either of their predetermined limits of axial movement.

5. A device for effecting a nonpositive driving connection between a driving means and a driven means comprising a generally cup-shaped member of magnetic material operatively connected to one of said means, a generally disc-shaped permanent magnet axially disposed with respect to said cup-shaped member and connected to the other means, a shell of nonmagnetic conductive material in said cup-shaped member adapted to be influenced by magnetic flux to produce a drag between said magnet and cup-shaped member upon relative rotation of these two parts, and means for relatively moving said magnet and cup-shaped member axially for varying the amount of flux threading said shell and thereby varying the torque applied to said driven means when said driving means is rotating including cam means on at least one of said movable parts and a fixed part of the device cooperating to move said magnet and cup-shaped member axially in opposite directions in response to changes in the direction of rotation of the rotating parts.

6. A device for effecting a nonpositive driving connection between a driving means and a driven means comprising a generally cup-shaped member of magnetic material operatively connected to one of said means, a generally disc-shaped permanent magnet axially disposed with respect to said cup-shaped member and connected to the other means, a shell of nonmagnetic conductive material in said cup-shaped member adapted to be influenced by magnetic flux to produce a drag between said magnet and cup-shaped member upon relative rotation of these two parts, means for relatively moving said magnet and cup-shaped member axially for varying the amount of flux threading said shell and thereby varying the torque applied to said driven means when said driving means is rotated including a shaft, a hub slidable longitudinally thereon for supporting one of said rotatable parts, and cam means on said hub and a fixed part of the device cooperating to move said magnet axially in response to changes in the direction of rotation of said hub, and means urging said hub in a direction to effect cooperating engagement of said cam means to condition the hub for axial movement whenever its direction of rotation is changed.

7. A coupling for transmitting torque comprising flux producing means, means associated with said flux producing means having axially spaced regions of different eddy current producing capacity, means supporting said last mentioned means and flux producing means for relative rotation and for axial movement between predetermined positions to vary the amount of flux threading the regions of different eddy current producing capacity thereby to increase or decrease the torque transmitting capacity of said coupling, and means automatically to shift said flux producing means and eddy current producing means relatively in an axial direction between said predetermined positions in response to changes in the direction of rotation of one of said producing means.

8. A coupling for transmitting torque comprising a flux producing means, means associated with said flux producing means having axially spaced regions of different eddy current producing capacity, and means supporting said last mentioned means and flux producing means for relative rotation and for axial movement between predetermined positions in response to changes in the direction of rotation of one of said producing means to vary the amount of flux threading the regions of different eddy current producing capacity including members movable relatively to vary the location of the predetermined positions to which said flux producing means and eddy current producing means are relatively movable for increasing or decreasing the proportion of the flux threading the different regions of said eddy current producing means when the latter and said flux producing means are at either of the predetermined positions to which they are relatively movable.

9. A coupling for transmitting torque comprising a flux producing means, means associated with said flux producing means having axially spaced regions of different eddy current producing capacity, means supporting said last mentioned means and flux producing means for relative rotation and for axial movement between predetermined positions to vary the amount of flux threading the regions of different eddy current producing capacity, thereby to increase or decrease the torque transmitting capacity of said coupling, cooperating cam means to shift said flux producing means and eddy current producing means relatively in an axial direction between said predetermined positions upon change in the direction of rotation of one of said means including a cam movable with one of said producing means, and means constantly to urge said cooperating cam means into cooperating engagement.

10. A coupling as defined in claim 9 wherein said cam means comprises cooperating helical formations and the means to urge said cam means into cooperating engagement comprises opposed compression springs.

11. A coupling for transmitting torque comprising flux producing means, means associated with said flux producing means having axially spaced regions of different eddy current producing capacity, means supporting said last mentioned means and flux producing means for relative rotation and for axial movement between predetermined positions to vary the amount of flux threading the regions of different eddy current producing capacity including members movable relatively to vary the location of the predetermined positions to which said flux producing and eddy current producing means are relatively movable for increasing or decreasing the proportion of the flux threading the different regions of said eddy current producing means when the latter and said flux producing means are at either of the predetermined positions to which they are relatively movable, cooperating cam means to shift said flux producing means and eddy current producing means relatively in an axial direction between said predetermined positions upon change in the direction of rotation of one of said means including a cam movable with one of said producing means, and means constantly to urge said cooperating cam means into cooperating engagement.

12. A coupling for transmitting torque between a rotary driving member and a rotary driven member comprising a flux producing means, eddy current producing means having axially spaced regions of different eddy current producing capacity, means to support said flux producing and eddy current producing means in operative relation for independent rotation including a rotatable shaft and a hub rotatable with said shaft and axially movable relative thereto between predetermined positions, one of said rotatable means being fixed to said hub so that the amount of flux threading said areas of different eddy current producing capacity can be varied by shifting the hub axially of the shaft, cooperating cam means to shift said hub in an axial direction between said predetermined positions upon change in the direction of rotation of said shaft including helical formations fixed to said hub and to a fixed part of said device, and opposed springs to urge said hub in a direction to hold the helical formation fixed thereto in cooperating engagement with the other of said helical formations.

13. A coupling for transmitting torque between a rotary driving member and a rotary driven member comprising a member of magnetic material having a generally cylindrical flange, a shell of high eddy current producing capacity in said cylindrical flange adjacent one of its ends, flux producing means including a circular peripheral portion of less diameter than said shell, means to support said flanged member and flux producing means for relative rotary and axial movement with the circular peripheral portion of the flux producing means coaxially located in said flange, and cooperating cam means relatively to shift said flux producing means and flanged member in response to changes in the direction of rotation thereof between predetermined axially spaced positions at which more or less flux threads said shell for varying the torque transmitting capacity of said coupling including a cam fixed to move with one of said rotary parts and a second cam means relative to which said first cam is movable, said flange being of sufficient dimensions in an axial direction to surround the circular peripheral portion of the flux producing means at either of the predetermined positions to which said rotary parts are relatively movable so that there is no change in the amount of flux threading said flange and thus no appreciable axial thrust when said rotary parts are shifted axially.

HORACE M. NORMAN.

REFERENCES CITED

The following references are of record in the file of this patent:

UNITED STATES PATENTS

| Number | Name | Date |
|---|---|---|
| 643,413 | Kennedy | Feb. 13, 1900 |
| 1,477,490 | Hough | Dec. 11, 1923 |
| 1,950,810 | Nichols | Mar. 13, 1934 |
| 2,193,214 | Winther | Mar. 12, 1940 |
| 2,447,130 | Matulaitis | Aug. 17, 1948 |

FOREIGN PATENTS

| Number | Country | Date |
|---|---|---|
| 354,040 | Great Britain | Aug. 6, 1931 |